US010757080B2

(12) United States Patent
Hatcher

(10) Patent No.: US 10,757,080 B2
(45) Date of Patent: *Aug. 25, 2020

(54) VAULTLESS TOKENIZATION ENGINE

(71) Applicant: NXT-Security, LLC, The Colony, TX (US)

(72) Inventor: Justin Hatcher, The Colony, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,648

(22) Filed: Jul. 1, 2019

(65) Prior Publication Data

US 2019/0327213 A1 Oct. 24, 2019

Related U.S. Application Data

(63) Continuation of application No. 15/682,651, filed on Aug. 22, 2017, now Pat. No. 10,389,688.

(60) Provisional application No. 62/378,512, filed on Aug. 23, 2016.

(51) Int. Cl.

| | |
|---|---|
| *H04L 29/06* | (2006.01) |
| *H04L 9/06* | (2006.01) |
| *G06F 21/60* | (2013.01) |
| *H04L 9/14* | (2006.01) |
| *G06F 21/62* | (2013.01) |
| *H04L 9/08* | (2006.01) |
| *H04L 29/08* | (2006.01) |

(52) U.S. Cl.
CPC ........ *H04L 63/0428* (2013.01); *G06F 21/602* (2013.01); *G06F 21/6254* (2013.01); *H04L 9/0643* (2013.01); *H04L 9/0891* (2013.01); *H04L 9/0894* (2013.01); *H04L 9/14* (2013.01); *H04L 63/061* (2013.01); *H04L 67/146* (2013.01); *H04L 63/08* (2013.01)

(58) Field of Classification Search
CPC ... H04L 9/0643; H04L 9/0891; H04L 9/0894; H04L 9/14; H04L 63/0428; H04L 63/061; H04L 67/146; H04L 63/08; G06F 21/602; G06F 21/6254
USPC ............................................................ 380/28
See application file for complete search history.

(56) References Cited

U.S. PATENT DOCUMENTS

| | | | | |
|---|---|---|---|---|
| 6,807,173 B1 * | 10/2004 | Lee | ...................... | H04L 65/1006 370/328 |
| 8,447,983 B1 * | 5/2013 | Beck | ...................... | H04L 9/0894 705/65 |
| 8,595,812 B2 * | 11/2013 | Bomar | .................. | G06F 21/335 713/172 |

(Continued)

*Primary Examiner* — Shahriar Zarrineh
(74) *Attorney, Agent, or Firm* — Nick Guinn; Gunn, Lee & Cave, P.C.

(57) ABSTRACT

A computer-readable medium storing computer program instructions, which, when executed by a processor, cause the processor to perform a method of tokenization, the method comprising the steps of receiving a request for tokenization from a user, the request including a Session Token; decoding and validating the Session Token; retrieving a token definition, a token key, and a security policy; appending the user key and the token key to the received value to create an input value; replacing each input value character with a known character to create a replacement input value using a lookup table; generating a secure hash of the replacement input value to create a derived key; substituting characters of the replacement input value with a character from lookup tables to create a third input value; and returning the input value to the user.

25 Claims, 7 Drawing Sheets

(56) References Cited

U.S. PATENT DOCUMENTS

| | | | | |
|---|---|---|---|---|
| 8,621,237 | B1* | 12/2013 | Bailey | G06F 21/602 713/189 |
| 8,739,262 | B2* | 5/2014 | Harper | G06F 21/335 726/9 |
| 8,856,869 | B1* | 10/2014 | Brinskelle | H04L 63/08 726/12 |
| 8,935,802 | B1* | 1/2015 | Mattsson | G06F 21/6245 726/26 |
| 8,978,152 | B1* | 3/2015 | Rozenberg | H04L 63/0428 726/26 |
| 9,081,978 | B1* | 7/2015 | Connolly | G06F 21/62 |
| 9,973,484 | B2* | 5/2018 | Reid | H04L 63/061 |
| 10,043,036 | B1* | 8/2018 | Dawkins | G06F 21/6254 |
| 2009/0249082 | A1* | 10/2009 | Mattsson | G06F 21/6218 713/193 |
| 2010/0070754 | A1* | 3/2010 | Leach | G06F 21/6254 713/152 |
| 2011/0213807 | A1* | 9/2011 | Mattsson | G06F 21/6245 707/802 |
| 2012/0278897 | A1* | 11/2012 | Ang | H04L 61/2596 726/26 |
| 2012/0321078 | A1* | 12/2012 | Chambers | H04L 9/0891 380/44 |
| 2013/0046995 | A1* | 2/2013 | Movshovitz | H04L 9/0618 713/189 |
| 2013/0080641 | A1* | 3/2013 | Lui | H04L 67/10 709/226 |
| 2013/0212007 | A1* | 8/2013 | Mattsson | G06Q 20/405 705/39 |
| 2014/0068706 | A1* | 3/2014 | Aissi | G06F 21/6254 726/1 |
| 2014/0177825 | A1* | 6/2014 | Mattsson | H04L 9/06 380/28 |
| 2014/0282464 | A1* | 9/2014 | El-Gillani | G06F 8/61 717/168 |
| 2015/0095252 | A1* | 4/2015 | Mattsson | G06F 16/84 705/325 |
| 2015/0096039 | A1* | 4/2015 | Mattsson | G06F 21/6254 726/26 |
| 2015/0096040 | A1* | 4/2015 | Mattsson | G06F 16/90335 726/26 |
| 2015/0096056 | A1* | 4/2015 | Mattsson | H04L 63/0807 726/29 |
| 2015/0312038 | A1* | 10/2015 | Palanisamy | H04L 9/3213 713/155 |
| 2015/0312246 | A1* | 10/2015 | Mattsson | G06F 16/22 726/26 |
| 2016/0019396 | A1* | 1/2016 | Davis | G06F 21/6209 713/193 |
| 2016/0070917 | A1* | 3/2016 | Rozenberg | G06F 16/9535 726/26 |
| 2016/0119289 | A1* | 4/2016 | Jain | H04L 63/0281 726/12 |
| 2016/0119296 | A1* | 4/2016 | Laxminarayanan | H04L 63/0428 713/168 |
| 2016/0253651 | A1* | 9/2016 | Park | G07F 9/023 705/39 |
| 2017/0053139 | A1* | 2/2017 | Schenk | H04L 63/0884 |
| 2017/0093812 | A1* | 3/2017 | Schenk | H04L 63/0428 |
| 2017/0116166 | A1* | 4/2017 | Burchett | G06F 17/24 |
| 2017/0171246 | A1* | 6/2017 | Arumugam | H04L 63/08 |
| 2017/0255932 | A1* | 9/2017 | Aabye | G06Q 20/38215 |
| 2017/0295155 | A1* | 10/2017 | Wong | H04L 63/08 |

* cited by examiner

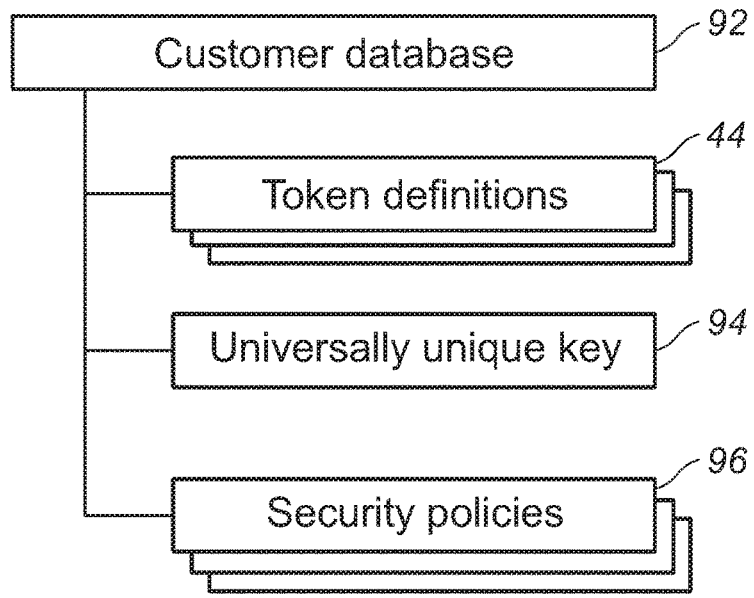

FIG. 6

```
('numeric', '1', '0', '0=2,1=6,2=3,3=9,4=5,5=8,6=4,7=0,8=1,9=7
('numeric', '1', '1', '0=0,1=5,2=1,3=4,4=8,5=9,6=3,7=2,8=6,9=7
('numeric', '1', '2', '0=3,1=5,2=9,3=7,4=8,5=2,6=1,7=4,8=0,9=6
('numeric', '1', '3', '0=9,1=2,2=1,3=4,4=5,5=0,6=7,7=6,8=3,9=8
('numeric', '1', '4', '0=7,1=2,2=0,3=1,4=8,5=3,6=4,7=9,8=5,9=6
('numeric', '1', '5', '0=3,1=7,2=2,3=1,4=4,5=6,6=9,7=8,8=5,9=0
('numeric', '1', '6', '0=1,1=3,2=6,3=8,4=4,5=0,6=7,7=2,8=5,9=9
('numeric', '1', '7', '0=0,1=8,2=7,3=6,4=9,5=5,6=1,7=2,8=4,9=3
('numeric', '1', '8', '0=6,1=3,2=7,3=0,4=4,5=5,6=2,7=8,8=1,9=9
('numeric', '1', '9', '0=2,1=5,2=1,3=0,4=7,5=4,6=8,7=3,8=9,9=6
('numeric', '1', '10', '0=2,1=3,2=4,3=5,4=1,5=7,6=8,7=0,8=9,9=6
('numeric', '1', '11', '0=5,1=0,2=1,3=9,4=8,5=4,6=6,7=7,8=3,9=2
('numeric', '1', '12', '0=8,1=6,2=9,3=0,4=4,5=5,6=1,7=2,8=7,9=3
```

FIG. 7

VAULTLESS TOKENIZATION ENGINE

CROSS REFERENCES TO RELATED APPLICATION

This continuation application claims priority to U.S. patent application Ser. No. 15/682,651 filed Aug. 22, 2017, which claims the benefit of U.S. Provisional Application No. 62/378,512, filed Aug. 23, 2016, which is incorporated by reference herein.

FEDERALLY SPONSORED RESEARCH OR DEVELOPMENT

Not applicable.

BACKGROUND OF THE INVENTION

1. Field of the Invention

The present invention relates generally to securing sensitive data. More specifically, the invention relates to a system and method of ciphering and deciphering data by substituting all or part of the original data with a non-sensitive surrogate value which looks like and has the same attributes as the original value.

2. Description of the Related Art

Several challenges exist in securing sensitive information (e.g., bank account numbers, credit card numbers, social security numbers, etc.) over the internet. The challenges often manifest themselves when multiple parties exchange or store the information. In a simple scenario, a user (e.g., a retail consumer) uses a wireless device to purchase a product from a merchant (e.g., a retailer). The sensitive information should remain secure on both the user and merchant sides so as to prevent a third-party from hacking and stealing the sensitive information. Merchants in this situation have started hiring security providers to store the information themselves and/or take other measures to secure the sensitive information and the transaction carrying the sensitive information. As the merchant participates in more and more sales transactions—and accordingly handles more sensitive information—or the security provider begins working with more and more customers of its own (i.e., the retailer) the sensitive information becomes cumulative and storage capacity becomes an increasing concern.

These challenges are not new and several systems and methods have been developed to address them. Many of the existing systems and methods, however, fall short for one or more reasons. These existing systems and methods, include: encryption with managed key management system; encryption with hosted key management system; managed vaulted tokenization; hosted vaulted tokenization; managed vaultless tokenization; and hosted vaultless tokenization.

All of these options attempt to protect data by moving people away from the data through ciphering it and making it unreadable. The ultimate problem with any data protection scheme is how to ensure the people who have access to the key(s) are not doing something naughty. In fact, by definition, all managed data protection options imply that a single entity or company is holding both the protected data and the means to unprotect it. In addition, Hosted Vaulted Tokenization can be ruled out because it has the same flaw in that an external party owns both the data and the means to decipher it. This is a fundamental flaw because your adversaries are not only people outside your company walls; but people you trust to manage your data. Furthermore, people make mistakes and inadvertently increase data exposure.

This leaves two remaining options: Encryption with Hosted Key Management System and Hosted Vaultless Tokenization. Both successfully separate the ciphered data from the means to decipher it. This leads to the concept of dual control; no single entity can do naughty things. With Vaultless Tokenization, there is no full persistent data that needs to be stored at the hosted site and the consumer/customer will only store non-sensitive tokens. Neither party can read the data without combining the parts that each other has. Furthermore, if a customer is storing its customers' data, the tokenization algorithm can include a secret value that only the end user provides, which extends accountability and access control to a third level such that all three entities would need to provide the piece that they know in order for one of the entities to gain access to the protected data.

In the present invention, the security provider does not maintain any values that customers send to the engine and clear text data is always overwritten in/cleared memory within seconds of an operation.

The present invention is superior to other known processes because it: (1) is extremely scalable and cost effective; and (2) eliminates data security issues in regards to the transmission, storage, and processing of sensitive data between two technology systems; and (3) because it can be deployed as a platform in the cloud, it can service multiple tenants/subscribers/customers at a time throughout the world; and (4) because the vaultless tokenization solution can be deployed as a platform in the cloud, it actually can eliminate the compliance needs and data regulations around data security that many companies face.

The present invention is further superior to other known methods and systems because: (1) data access is decoupled from data storage or the data itself in that if sensitive data is completely replaced with surrogate values, the access can be more tightly controlled because a user of the system is now not trying to protect the data but rather the means to read the data; (2) a cloud-based vaultless tokenization solution does not exist. There are many cloud-based vaulted solutions but those merely transfer the risk of sensitive data breach rather than mitigate the risk; and (3) Essentially this can be looked at and used as endpoint data security where tokenizing data is performed at the earliest point in a process and detokenization at the very last step in a process such that all components in between never access the true data and are completely secured from data theft and breach. (4) Tokenization performed by these means can effectively preserve format including language.

BRIEF SUMMARY OF THE INVENTION

The invention is a system and method for securing sensitive information. The process replaces a sensitive value with a surrogate non-sensitive equivalent. Instead of replacing the entire value (like a vault), the present invention breaks a given value down into smaller chunks and replaces each chunk many times using smaller lookup tables. Each time a chunk of data is replaced, the engine's algorithm mutates and generates a new key to use to replace the next chunk of data. The resulting tokens are infeasible to reverse in the absence of the tokenization system because unique keys, a unique process, and a unique series of lookup tables is utilized for every value that the engine processes.

The method of the present invention comprises the steps of receiving a request for tokenization from a user, the request containing a Session Token, a token definition logically related to the user, and a received value, wherein the Session Token includes a policy identifier logically related to the user and a unique key logically related to the user; decoding and validating the Session Token; retrieving the token definition, a token key logically related to the token definition, and a security policy related to the user from a database logically relating the token definition, the token key, and the security policy to the user; appending the user key and the token key to the received value to create an input value having more than one input value character; replacing each input value character of the input value with a known character to create a replacement input value, where the known character is related within a lookup table to the input value character according to the token definition; generating a cryptographically secure hash of the replacement input value to create a derived key; substituting each character of the replacement input value with a character from one or more lookup tables to create a third input value, the one or more lookup tables being selected based on one or more of the received value, the position of the character being replaced within the replacement input value, and the derived key; and returning the third input value to the user as a token.

BRIEF DESCRIPTION OF THE SEVERAL VIEWS OF THE DRAWINGS

FIG. 6 depicts a customer database object.

FIG. 7 shows an example of a lookup table.

DETAILED DESCRIPTION OF THE INVENTION

Figure 1:
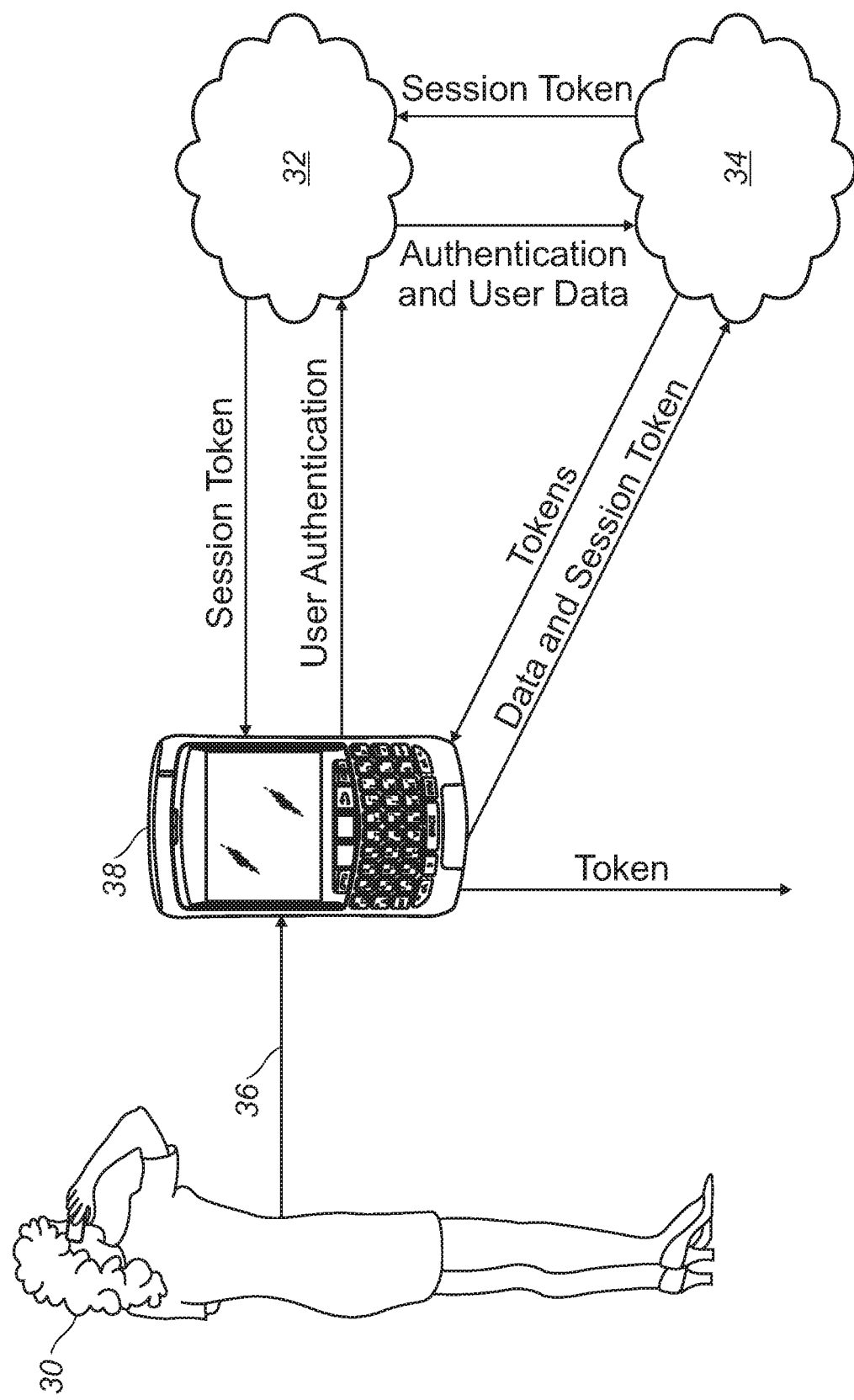
FIG. 1 is a flowchart showing the overall organization and connection of user, customer and security provider to accomplish the vaultless tokenization of sensitive information.

FIG. 1 is a flowchart showing the overall relationship and exchange of information between a user 30 (e.g., a retail customer), a customer 32 (e.g., a retail merchant), and a security provider 34 to accomplish the vaultless tokenization of sensitive information (i.e., user data) 36.

From an overview, with different exchanges occurring at different times-discussed in detail below—the user 30 inputs or otherwise provides data to a device 38 such as a smartphone. The device 38 connects to 32 via the internet. To that end, and in this embodiment, the tokenization method described herein is exposed over the internet via HTTP web services. The customer 32 authenticates the user 30 then requests a session token 38 from the security provider 34 by authenticating with user data 36 and a security policy(s) that authorizes specific actions to the user 30 for a specific time (i.e., expiration date or time). The device 38 provides the security provider 34 with data and the session token over a secure channel using client-side tokenization. The security provider 34 provides the user 30 with a token. At the end, the user data 36 is secured locally at the point of input (e.g., device) 36.

In some embodiments, user data 36 can be stored securely and transmitted once the data is completely substituted and access controlled by policies setup by WV. This occurs because the compromise of protected data requires: compromising data, the customer, and the token engine to decipher—not just an encryption key.

Figure 3:
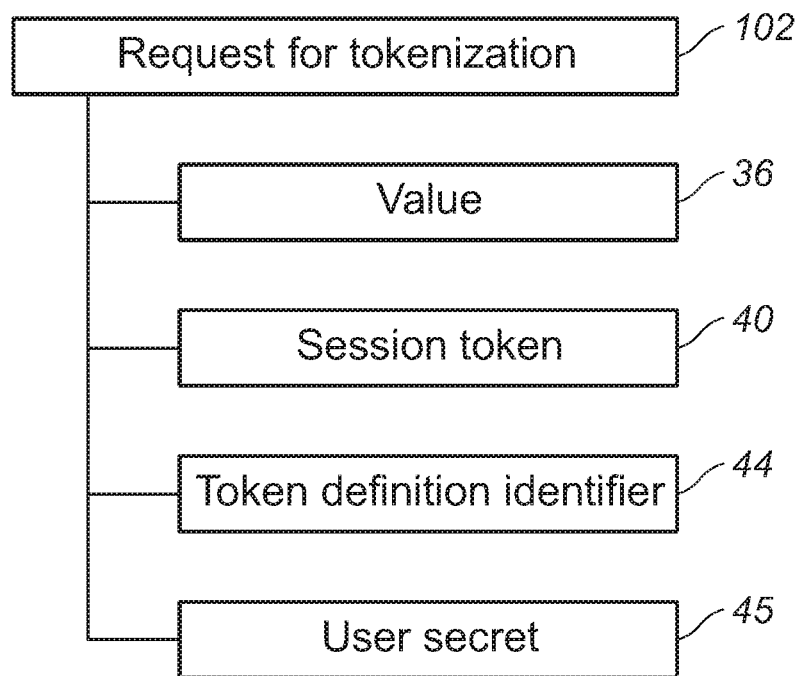
FIG. 3 depicts a request for tokenization.

After the customer 32 has authenticated the user 30, in step 102, the customer 32 makes a request for tokenization. As shown in FIG. 3 a request for tokenization 102 comprises a session token 40, a value 36, a token definition identifier 44, and a user secret 45. A user value 36 is any string of characters provided in a request for tokenization 102 or detokenization (e.g., "John Doe" where the type of sensitive data is a name; "123-45-6789" where the type of sensitive data is a social security number, etc.). A user secret 45 might consist of an answer provided by the user 30 (and presumably known only by the user) in response to a question (e.g., "what is your favorite book?").

Figure 4:
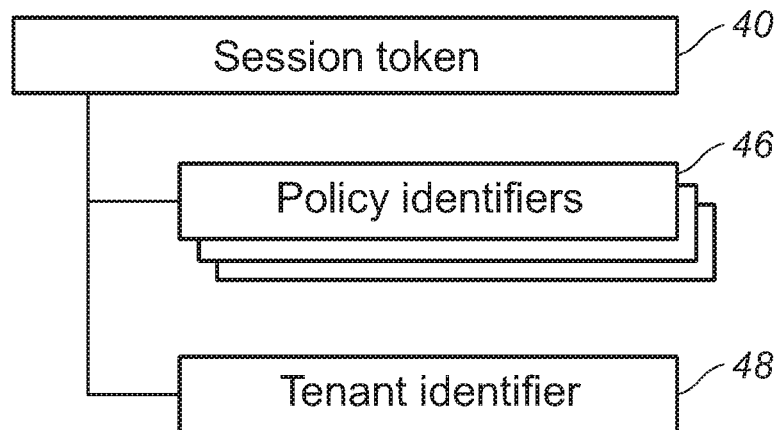
FIG. 4 shows a session token object.

As shown in FIG. 4 a session token 40 comprises one or more policy identifiers 46, and a tenant identifier 48. For convenience, the terms tenant and customer are used interchangeably.

A token definition is a set of configurations that defines how the engine will process values during tokenization or detokenization.

Figure 5:
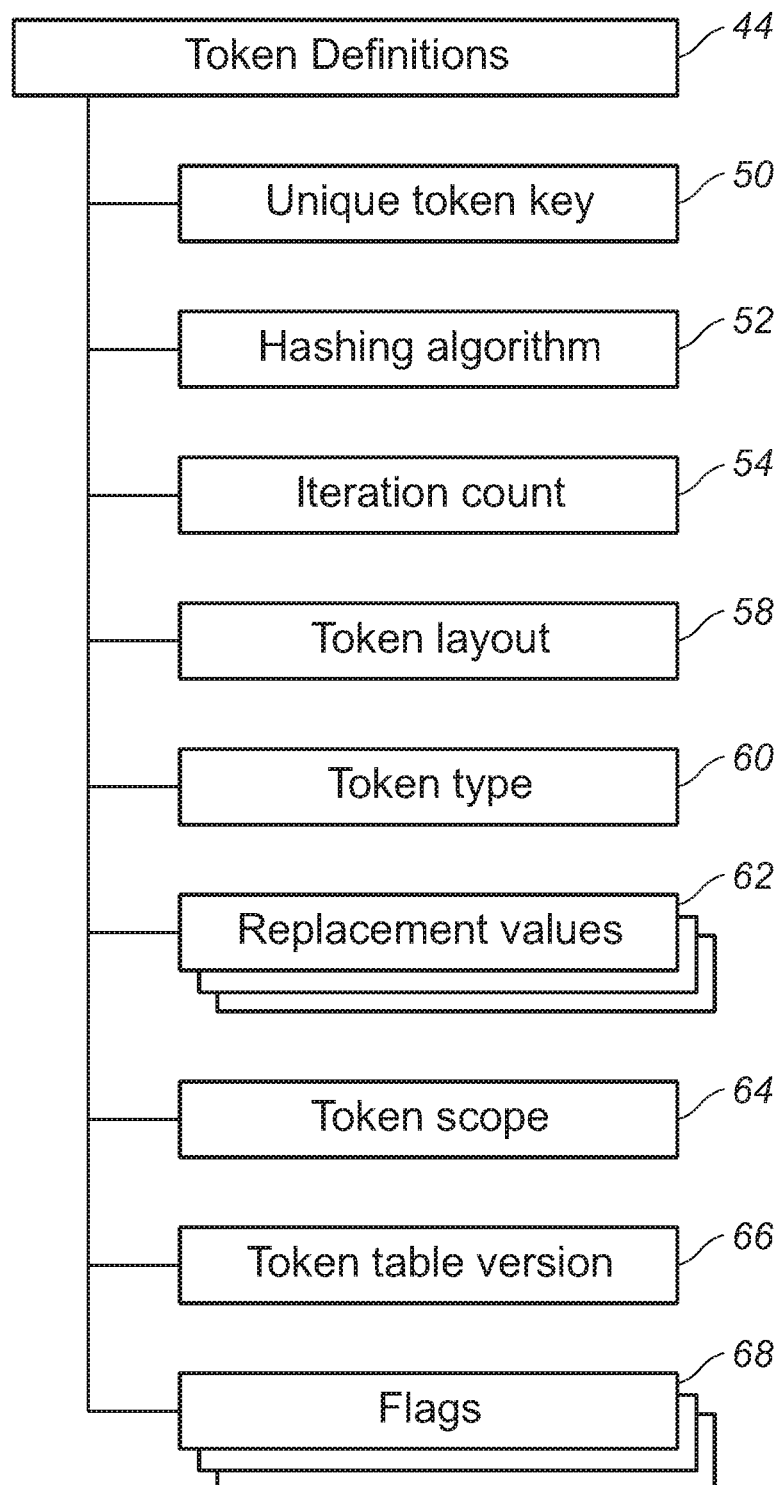
FIG. 5 depicts a token definition object.

As shown in FIG. 5 a token definition 44 comprises a universally unique key 50, a hashing algorithm 52 (i.e., derived key generation mechanism) (e.g., SHA2), an iteration count 54, a token layout 58, a token type 60 (e.g., date, time, string, numeric, etc.), one or more replacement values 62, a token scope 64 (e.g., global, session, random; this attribute controls one of the salt values which can make a token engine run differently depending on time), a token table version 66, and one or more flags 68 controlling how the resulting token should be formatted.

The universally unique key 50 is generated by applying a hash algorithm (e.g., SHA2) to the combination of a value (e.g., user data) 36 and several salt values, wherein one of the salt values is a UUID. A salt is random data used as an additional input to a function that "hashes" a password. Salts are used to defend against various attacks. Salts safeguard passwords during storage. Typically, the salt and the password are concatenated and run through a cryptographic hash function. The resulting output is stored with the salt in a database, rather than the underlying password. Hashing allows for later authentication without keeping and therefore risking the plaintext password in the event that the authentication data store is compromised.

Figure 2:
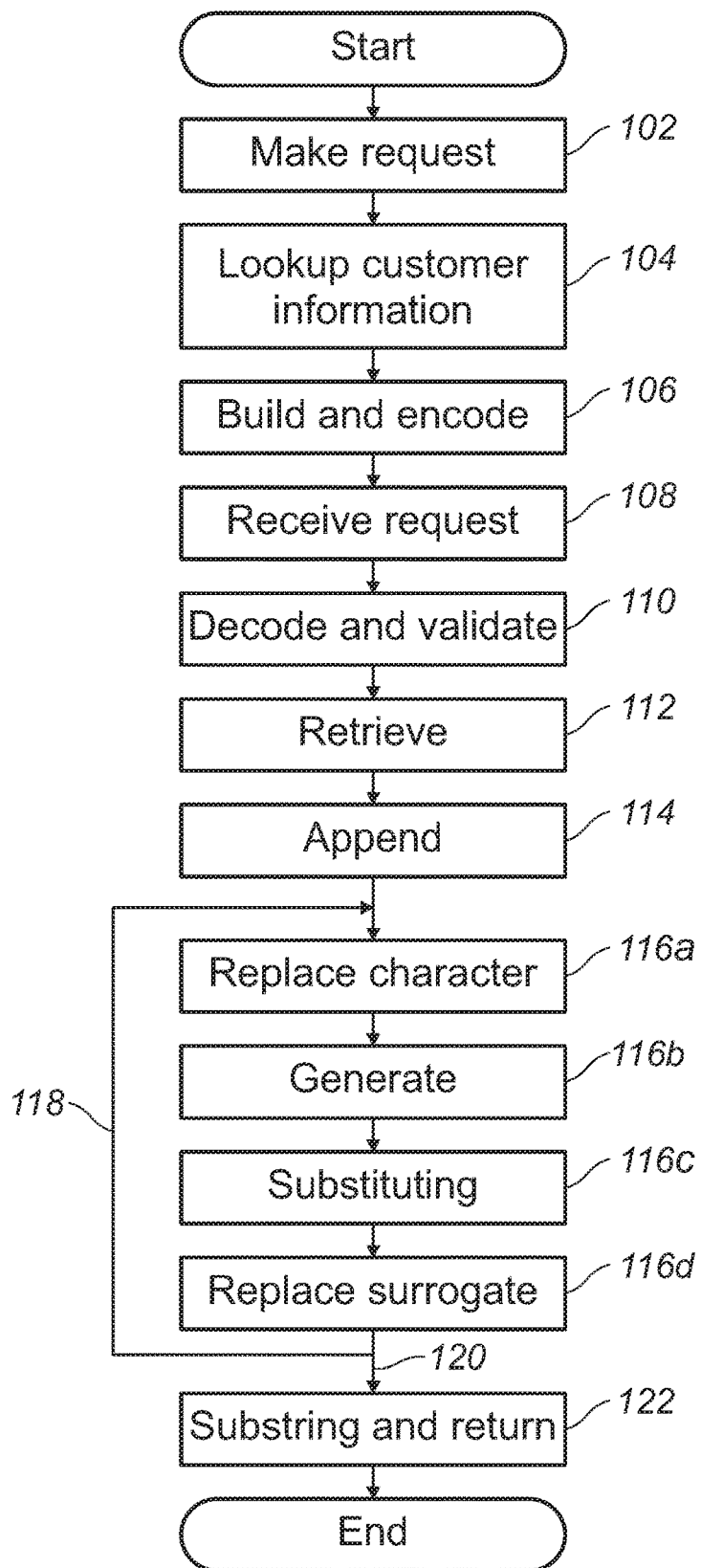
FIG. 2 shows a block diagram of a system embodying the invention.

Referring again to FIG. 2, in step 104 the security provider 34 (i.e., the engine) retrieves tenant metadata and the security policy configuration from a customer database 92. In alternative embodiments, the security provider retrieves tenant metadata and the security policy configuration from a cache.

As shown in FIG. 6, the engine reviews a customer database 92 for a universally unique key 94 (with respect to the customer), one or more token definitions 44, and one or more security policies 96. Security policies 96 are customer 32 defined. By way of illustration, if a token definition 44 is a set of configurations that defines the data and is used by the tokenization engine, then the security policies 96 define when and who can access the data. Examples of security policies 96, include: allowing only requests from specific IP addresses tokenize data using a particular token definition;

allowing only requests from Australia read masked value data using the a particular token definition; allowing only Acme company to tokenize, detokenize their data using any token definition they create; etc.

In some embodiments, a security policy is required before any request is made. Implementing such a limitation allows the security provider 34 to audit and record every user interaction to know when, how and what data is being access by who and if the user was successful.

Referring back to FIG. 2, in step 106 the engine 34 builds and encodes a session token 40 using all policy identifiers 46 and tenant unique keys 48. Accordingly, the session token 40 internally references its security policy and tenant. In this embodiment, the session token 40 expires in a configured period of time as the customer has set when creating the security policy definition. By example, a session token 40 might take the following form: 1X4acoMYSxblvLju9mar4FY+A051Tuuu+ fQetxrAziVn8q214DdG2qQ5MJMsjpgtwTV 8NoIuMTkwLjc3LjE1MnwwfDF8MXwwfDJqbWo3bD VyU3cwCQZim1+s7E58t0pPmt fOPzHtJD7yJ4/a/ wmdN5u2Mh0MW7xnFv/vU".

Referring again to FIG. 2, in step 110, the security provider 32 decodes and validates the session token. That is, the session token is authorized against the policy definition. Validating and deconstructing a session token 40 involves running the tokenization process in reverse to resolve a session token back to session data. Decoding is the reverse process of creating a session token. It involves detokenizing the session token, then decoding from base64 (or other decoding scheme), which will result in the session token details as a string of attributes such as policyid, tenantid, timestamp. The validation step occurs when the security provider confirms that the session token is not expired, and that the security policy that is contained in the session token is authorized to perform a requested API action on a specific token definition. By example, an API action might include tokenize, detokenize, getmasked, encrypt.

In step 112, the security provider retrieves the token definitions 44, a token key 50 logically related to the token definition 44, and a security policy 46 related to the user 30 from the database logically relating the token definition 44, the token key 50, and the security policy 46 to the user 30.

In step 114, the security provider 34 appends the user value 36 and the tenant unique key 48 (i.e., tenant definition key), to the token unique key 44 (i.e., token definition key) and the user secret 45. The resulting, new value is the input value 97. If the token scope 64 is "global," the input value is created by appending the value, a static salt value, a unique token key and a client secret. If the token scope 64 is "session," the new value is created by appending the value, a static salt value, a session seed (which is a UUID) and a client secret. If the token scope 64 is "random," the new value is created by appending the value, a static salt value, a UUID and a client secret.

In step 116a-116d the security provider traverses each character in the input value 97 according to format configurations provided by the customer 32 on the token definition 44. In step 116a a single character at the index is substituted with a common static character that will be the same for every operation of the given token definition configurations-as described above. The replacement of a character with a static "known" character before performing the one-way hash to obtain the derived key is important because it allows deconstruction and makes detokenization possible by reversing the process.

In step 116b, and once the single character at the index is substituted with the common static character-based on the token definition configurations-a salt value is appended to the common static character. After the salt value is appended to the common static character, a one-way secure hash is performed. In this embodiment, the security provider uses a SHA2 hash. However, any hash algorithm or encryption mechanism could work.

The result of the hash algorithm on the combination of the common static character and the salt value is called a derived key 98.

In alternative embodiments, the derived key might be a function of the original value of the single character at the index. Because hash algorithms are by definition one-way, the derived keys would not be reproducible unless this process was used.

In step 116c, one or more replacement tables (i.e., lookup tables) are selected from a pool of tables. In this embodiment, the decision for selecting the one or more replacement tables is based on the input value 97, the index, the value of the single character (i.e., character value) at the index, and the derived key 98. If two or more replacement tables are selected their order should be randomized from the perspective of a user because the user will not know the derived key at the time of the underlying request. However, the replacement tables will iterated in a deterministic order because the derived key is used to select and arrange the replacement tables in a particular order. Then, iterating through the series of two or more replacement tables, the engine 34 looks up a surrogate replacement value in translating the character value through each of the replacement tables. That is, the process will traverse each of the two or more replacement tables for translation.

FIG. 7 is an example of a numeric, replacement table. Reading this table from left to right, the first column reflects the type of characters mapped between. In this table the type is "numeric," to be used for values ranging from zero to nine. Alternative types might include upper case letters, lower case letters, alphanumeric, symbols, etc. The next column designates the version of the table. The third column speaks to the index of the character to be replaced. Because a string of data could include more than thirteen digits/ indexes, a table could be larger. Both version and index increment and represent different permutations and random sets of key/value mappings. The last column reflects the key/value mappings.

In this preferred embodiment of the invention, replacement tables do not grow with the number of tokens. Also in this preferred embodiment, a pool of hundreds of thousands of replacement tables are used, which map small pieces of values such as a single character to a surrogate character (e.g., in table 1, 1=2, in table 2, 1=3, so on and so on). rather than the full value. Alternatively, tables may contain more than a single character. So a table value pair could also be "AB2"="XD6".

By incorporating a large selection of replacement tables, the security provider is afforded greater flexibility, greater randomization and accordingly greater protection to the customer and user. In a preferred embodiment, each table is tagged with a descriptor value that can tell the engine the types of values the table contains. During a tokenization request, judging by the source data being requested for tokenization/detokenization, a smaller pool of replacement tables can be selected based on data elements contained. From there, the security provider can generate a unique value using the data that was provided in addition to several salt values, which are secure static values in preferred embodiments. However, in alternative embodiments a customer may configure the values to be contextual or completely random. To generate the derived key—as described above—a cryptographically secure algorithm is used, such as SHA2.

There are a variety of different replacement tables available that enable the security provider to use the replacement tables to perform tokenization on other data like dates, times, numeric, alphanumeric, and other languages.

In some embodiments, the replacement table values can equal themselves. Alternatively, the values might never equal the same value based. This characterization of replacement tables is based on a customer configuration of the tokenization engine. In preferred embodiments the replacement tables are highly optimized for speed and take into count several indexes that allow for more complexity during the tokenization process.

Referring again to FIG. 2, in step 116d, the resulting character is substituted into the character value at the current index. By example, assume the character at the index in the derived key 98 is "1." If "1" becomes "2" in table 1, then the resulting value is processed through table 2 where the value "2" becomes "4", and finally the resulting value is processed through table 3 where the value "4" to "5." If "5" is the result of the final table, then the number "5" is inserted back into the original value at the same index.

In step 118, the next character in the input value sequence is then run through the steps 116a-116d until all characters have been substituted through steps 116a-116d. Because the value changes during each replacement and because the changing value is a component of creating the derived key 98, it is becomes extremely difficult to predict or determine the randomness of the replacement values that ultimately result from the tokenization process.

Once all characters in the input value have been substituted through steps 116a-116d, the process no longer repeats steps 116a-116d 120, the engine strips off the salts previously added in step 122. The resulting value (i.e., string of characters) is the final token value 99. The final token value 99 is then secured locally at the point of input 38, with the user 30. Because of this process, the security provider 34 is not required to store the secured data on its own servers or other media.

The process of deconstructing a token involves running this process in reverse, and processing the replacement of values in reverse order than was used to generate the token. The security provider 34 retrieves the final token 99, session token, and token definition identifier from the user 30 at the point of input 38. The security provider 34 returns the final token 99 to its form containing the salts previously added in step 122. The security provider begins identifying a surrogate value at a particular index. First, the character(s) are replaced with static value(s) defined in the token definition. Then the derived key is generated (the derived key is used to select and order the lookup tables that will be used for the translation. Second, security provider then proceeds to reverse translate (i.e., replacing one value with a different value) the surrogate value identified in in the previous step using the one or more lookup tables provided for based on the token definition, input value, index, character value and the derived key. Third, the process continues by processing the derived key in reverse through the algorithm (tokenization engine 118). The resulting value is the input value. Fourth, the process continues by requiring the security provider to replace the character at the index with the original character at that index based on the token definition configurations. The prior four steps are repeated until all substituted characters have been replaced with their original values in the input value.

The security provider then trims input value 97 such that the user value 36, the tenant unique key 48, the token unique key 44 and the user secret 45 are no longer appended. The security provider returns the user value to the user.

One of ordinary skill in the art will appreciate a variety of embodiments that capture the spirit of the present invention. For instance, other information may be included when creating input value. Such information might include information regarding the API, an expiration date or time, source Internet Protocol (IP) information, information for debugging/flagging, security policy identification, identifying information regarding one or more keys, security flags, proxy identification, etc.

Figure 8:
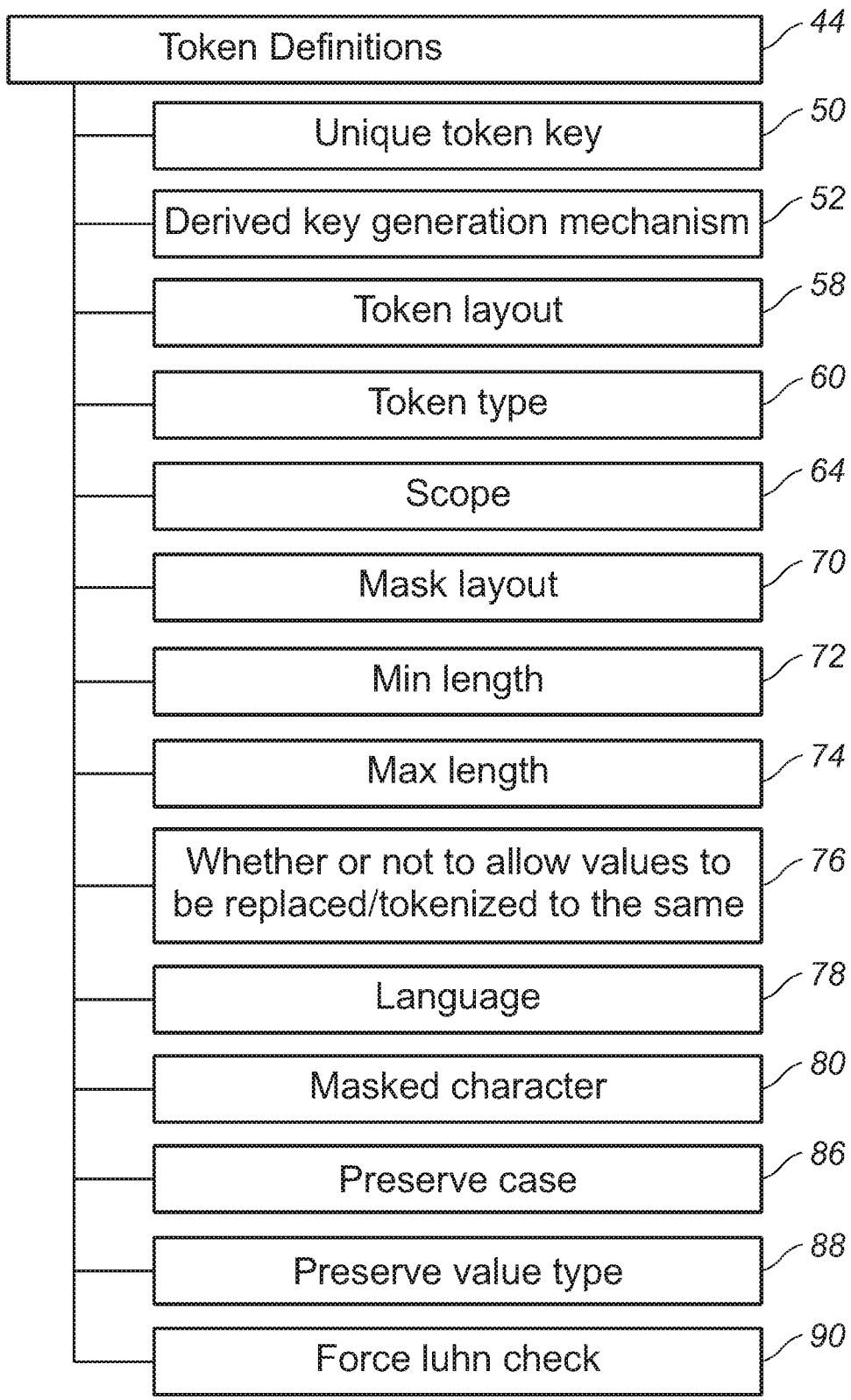
FIG. 8 depicts a token definition object of an alternative embodiment.

FIG. 8 illustrates a token definition of an embodiment alternative to the token definition illustrated in FIG. 5. The token definition of FIG. 8 comprises a unique token 50, a token layout 58, a mask layout 70, a minimum token length 72, a maximum token length 74, whether or not to allow values to be replaced/tokenized to the same value 76, a token type 60 (e.g., date, time, string, numeric, etc.), a language 78 (e.g., English, Spanish, etc.), a masked character 80 (e.g., *), a hashing algorithm 52 (i.e., derived key generation mechanism) (e.g., SHA2), a preserve case 86 (e.g., true, false), a preserve value type 88 (e.g., true, false), a force luhn check 90, and a token scope 64.

Figure 9:
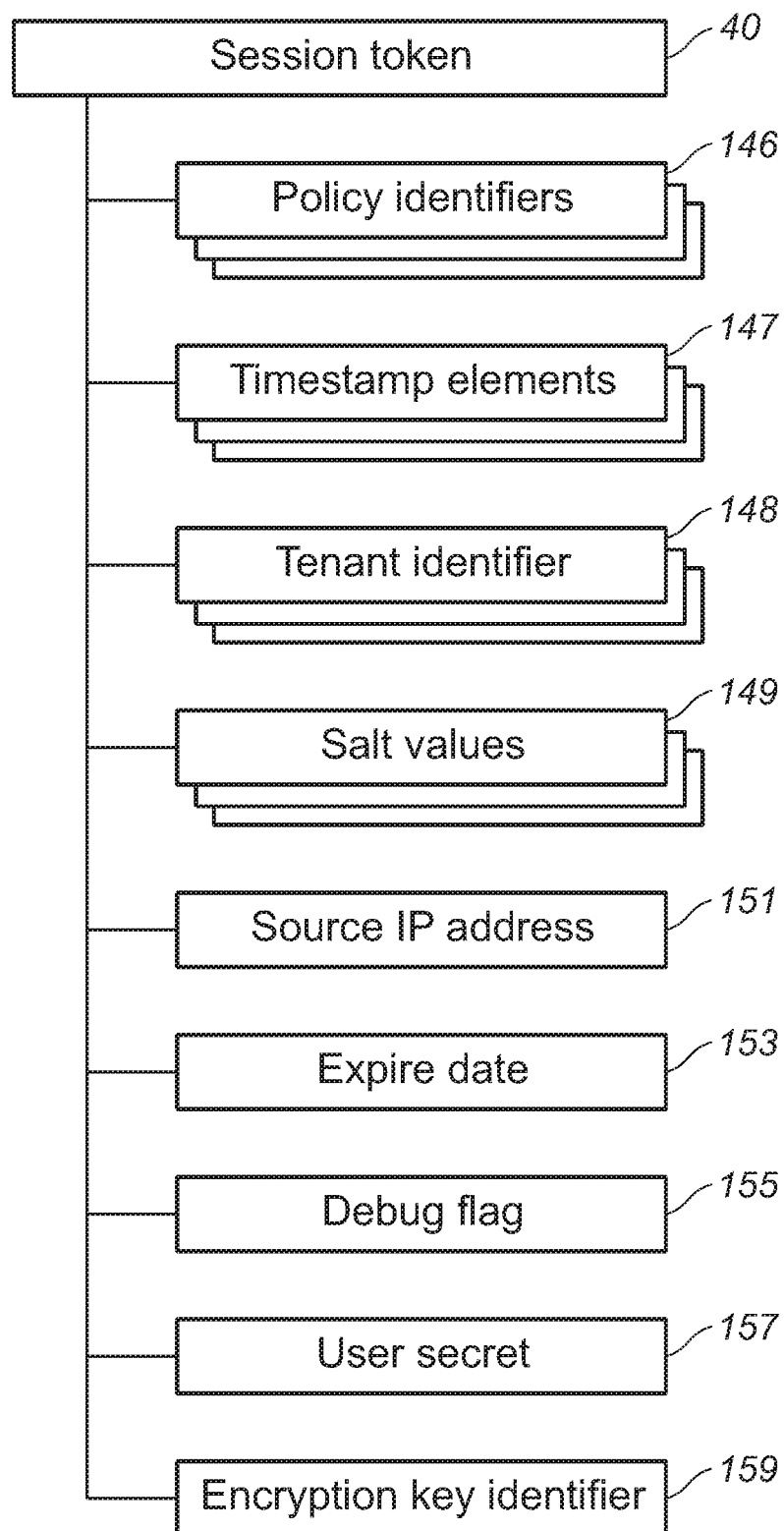
FIG. 9 depicts a session token object of an alternative embodiment.

FIG. 9 illustrates a session token 140 of an embodiment alternative to the session token 40 illustrated in FIG. 4. The session token 140 of FIG. 9 comprises one or more policy identifiers 146, one or more timestamp elements 147, one or more tenant identifiers 148, one or more salt values 149 that can be used to further customize the tokenization engine, a source IP address 151, an expiration date 153, a debug flag 155, a user secret 157, and an encryption key identifier 159. The user configurable timestamp 147 is used to secure access by a time limit. The salt values would be included in the function to assist generate the derived key. A user secret is such a salt value that can be entered when requesting tokenization and this value can be included in the session token.

In other alternative embodiments, different means for running a hash algorithm over the combined derived key and salt value may be used.

In other alternative embodiments, the engine may execute an encryption method rather than a tokenization method when executing the sequence of steps 116a-116d.

In some embodiments customer 32 has an API key and access to a configuration management portal to make changes to their service configurations such as token definitions, security policies, and more.

The present invention is described above in terms of a preferred illustrative embodiment in which a specifically described vaultless tokenization engine and method are described. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

I claim:

1. A non-transitory computer-readable medium storing computer program instructions, which, when executed by a processor, cause the processor to perform a method of tokenization, the method comprising the steps of:
   receiving a request for tokenization from a user, the request containing a Session token, a token definition logically related to the user, and a received value, wherein the Session token includes a policy identifier logically related to the user and a unique key logically related to the user, and wherein the token definition comprises three or more of the following attributes:
a unique key;
a hashing algorithm;
an iteration count;
a token layout;
a token type;
one or more replacement values;
a token scope;
a token table version;
a masked character;
a force luhn check;
a language;
a mask layout;
a maximum token length;
a minimum token length;
a preserve case;
a preserve value type;
a unique token;
an attribute for whether or not to allow values to be replaced to a same value; and
one or more flags controlling how the resulting token should be formatted;
decoding and validating the Session token;
retrieving the token definition, a token key logically related to the token definition, and a security policy related to the user from a database logically relating the token definition, the token key, and the security policy to the user;
appending the user key and the token key to the received value to create an input value having more than one input value character;
replacing each input value character of the input value with a known character to create a replacement input value, where the known character is related within a lookup table to the input value character according to the token definition;
generating a cryptographically secure hash of the replacement input value to create a derived key;
substituting each character of the replacement input value with a character from one or more lookup tables to create a third input value, the one or more lookup tables being selected based on one or more of the received value, the position of the character being replaced within the replacement input value, and the derived key; and
returning the third input value to the user as a token.

2. The non-transitory computer-readable medium of claim 1 wherein the request for tokenization from a user further contains a user secret.

3. The non-transitory computer-readable medium of claim 1 wherein the method is carried out by one or more tokenization servers and a security provider does not have access to any of the one or more tokenization servers.

4. The non-transitory computer-readable medium of claim 1 wherein a customer manages how data is accessed and who can obtain the full clear text or partially masked data after combining all the "partial-keys" from the various entities involved using one or more security policies.

5. The non-transitory computer-readable medium of claim 1 wherein the cryptographically secure hash is SHA2.

6. The non-transitory computer-readable medium of claim 1 wherein a security policy is required to be declared before a request for tokenization is made.

7. The non-transitory computer-readable medium of claim 5 wherein a security provider audits and records every user interaction to know when, how and what data is accessed by who.

8. The non-transitory computer-readable medium of claim 1 wherein a customer has an API key and access to a configuration management portal.

9. The non-transitory computer-readable medium of claim 7 wherein the customer changes its service configurations.

10. A non-transitory computer-readable medium storing computer program instructions, which, when executed by a processor, cause the processor to perform a method of tokenization, the method comprising the steps of:
receiving a request for tokenization from a user, the request containing a Session token, a token definition logically related to the user, and a received value, wherein the Session token includes a policy identifier logically related to the user and a unique key logically related to the user, and wherein a customer has an API key and access to a configuration management portal;
decoding and validating the Session token;
retrieving the token definition, a token key logically related to the token definition, and one or more security policies related to the user from a database logically relating the token definition, the token key, and the security policy to the user, wherein a customer manages how data is accessed and who can obtain the full clear text or partially masked data after combining all the "partial-keys" from the various entities involved using one or more security policies;
appending the user key and the token key to the received value to create an input value having more than one input value character;
replacing each input value character of the input value with a known character to create a replacement input value, where the known character is related within a lookup table to the input value character according to the token definition;
generating a cryptographically secure hash of the replacement input value to create a derived key;
substituting each character of the replacement input value with a character from one or more lookup tables to create a third input value, the one or more lookup tables being selected based on one or more of the received value, the position of the character being replaced within the replacement input value, and the derived key; and
returning the third input value to the user as a token.

11. The non-transitory computer-readable medium of claim 10 wherein the request for tokenization from a user further contains a user secret.

12. The non-transitory computer-readable medium of claim 10 wherein the method is carried out by one or more tokenization servers and a security provider does not have access to any of the one or more tokenization servers.

13. The non-transitory computer-readable medium of claim 10 wherein the cryptographically secure hash is SHA2.

14. The non-transitory computer-readable medium of claim 10 wherein a security policy is required to be declared before a request for tokenization is made.

15. The non-transitory computer-readable medium of claim 13 wherein a security provider audits and records every user interaction to know when, how and what data is accessed by who.

16. The non-transitory computer-readable medium of claim 10 wherein the token definition comprises one or more of the following attributes:
- a unique key;
- a hashing algorithm;
- an iteration count;
- a token layout;
- a token type;
- one or more replacement values;
- a token scope;
- a token table version;
- a masked character;
- a force luhn check;
- a language;
- a mask layout;
- a maximum token length;
- a minimum token length;
- a preserve case;
- a preserve value type;
- a unique token;
- an attribute for whether or not to allow values to be replaced to a same value; and
- one or more flags controlling how the resulting token should be formatted.

17. The non-transitory computer-readable medium of claim 15 wherein the customer changes its service configurations.

18. A non-transitory computer-readable medium storing computer program instructions, which, when executed by a processor, cause the processor to perform a method of tokenization, the method comprising the steps of:
- receiving a request for tokenization from a user, the request containing a Session token, a token definition logically related to the user, a user secret, and a received value, wherein the Session token includes a policy identifier logically related to the user and a unique key logically related to the user, and a security provider does not have access to any of the one or more tokenization servers;
- decoding and validating the Session token;
- retrieving the token definition, a token key logically related to the token definition, and a security policy related to the user from a database logically relating the token definition, the token key, and the security policy to the user;
- appending the user key and the token key to the received value to create an input value having more than one input value character;
- replacing each input value character of the input value with a known character to create a replacement input value, where the known character is related within a lookup table to the input value character according to the token definition;
- generating a cryptographically secure hash of the replacement input value to create a derived key;
- substituting each character of the replacement input value with a character from one or more lookup tables to create a third input value, the one or more lookup tables being selected based on one or more of the received value, the position of the character being replaced within the replacement input value, and the derived key; and
- returning the third input value to the user as a token.

19. The non-transitory computer-readable medium of claim 18 wherein a customer manages how data is accessed and who can obtain the full clear text or partially masked data after combining all the "partial-keys" from the various entities involved using one or more security policies.

20. The non-transitory computer-readable medium of claim 18 wherein the cryptographically secure hash is SHA2.

21. The non-transitory computer-readable medium of claim 18 wherein a security policy is required to be declared before a request for tokenization is made.

22. The non-transitory computer-readable medium of claim 20 wherein a security provider audits and records every user interaction to know when, how and what data is accessed by who.

23. The non-transitory computer-readable medium of claim 18 wherein a customer has an API key and access to a configuration management portal.

24. The non-transitory computer-readable medium of claim 18 wherein the token definition comprises one or more of the following attributes:
- a unique key;
- a hashing algorithm;
- an iteration count;
- a token layout;
- a token type;
- one or more replacement values;
- a token scope;
- a token table version;
- a masked character;
- a force luhn check;
- a language;
- a mask layout;
- a maximum token length;
- a minimum token length;
- a preserve case;
- a preserve value type;
- a unique token;
- an attribute for whether or not to allow values to be replaced to a same value; and
- one or more flags controlling how the resulting token should be formatted.

25. The non-transitory computer-readable medium of claim 22 wherein the customer changes its service configurations.

* * * * *